April 14, 1964 P. FALLSCHEER 3,128,957
YARN GUIDING TRAVERSE ROLL
Filed May 29, 1962
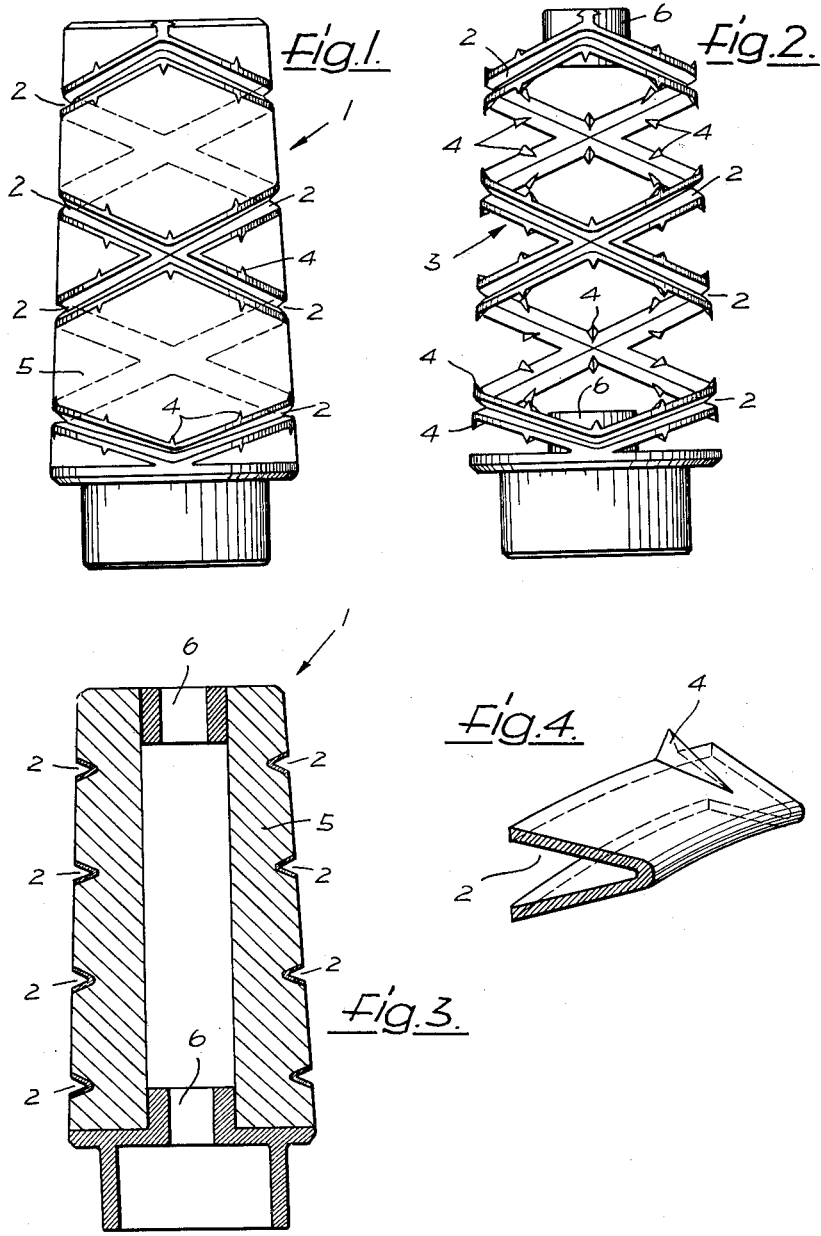
INVENTOR
Paul Fallscheer
ATTORNEY

United States Patent Office 3,128,957  
Patented Apr. 14, 1964

3,128,957  
YARN GUIDING TRAVERSE ROLL  
Paul Fallscheer, Reutlingen, Wurttemberg, Germany, assignor to Emil Adolff, Kommanditgesellschaft, Reutlingen, Wurttemberg, Germany  
Filed May 29, 1962, Ser. No. 198,626  
Claims priority, application Germany June 2, 1961  
5 Claims. (Cl. 242—43.2)

The present invention relates to a yarn-guiding traverse roll which is provided with helical grooves for guiding the yarns so as to produce cross-wound bobbins.

Although yarn-guiding traverse rolls have in the past been made of many different kinds of materials, it is advisable to make them of a highly wear-resistant material in order to withstand the wear to which they are subjected by guiding the yarn. However, such materials as well as the work of machining and finishing them are very expensive.

It is an object of the present invention to provide a yarn-guiding traverse roll which is as wear-resistant as possible and may be produced at the lowest possible cost. This object is attained according to the present invention by providing a basket-like, preferably helically wound band of a wear-resistant material which contains helical yarn-guiding grooves and is embedded in a supporting body of a relatively inexpensive material. It is thus possible in a very simple manner to make those parts of the yarn-guiding traverse roll which are exposed to wear of a highly wear-resistant material and to limit the required amount of this material to a minimum. Since the grooved band constituting a skeleton has to be only very thin, it may be made by a conventional method which requires very little subsequent machining and finishing operations. Thus, for example, the grooved band may be made of steel by a high-quality or precision casting method or of bronze or aluminum by pressure casting, or of suitable thermoplastic by injection molding, or of casting or epoxide resins by a casting or spreading method. Since the actual labor which is required for producing and finishing a yarn-guiding traverse roll according to the present invention is very neglectable and since it also requires very little expensive material, it may be made at a considerably lower cost than the prior yarn-guiding traverse material which had to be made entirely of high-grade material.

With these and other objects in view, which will become apparent in the following detailed description, the present invention will be clearly understood in connection with the accompanying drawing, in which:

FIGURE 1 is a side elevation of a complete yarn-guiding traverse roll according to the present invention;

FIGURE 2 is a side elevation of a grooved basket-like, preferably helically shaped band for the yarn-guiding traverse roll according to FIG. 1;

FIG. 3 is an axial section of the yarn-guiding traverse roll according to FIG. 1, and FIG. 4 is an enlarged perspective view of a section of the grooved helically wound band according to FIG. 2.

Referring now to the drawings, the yarn-guiding traverse roll 1, as shown in FIG. 1, consists of a self-supporting basket-like, preferably helically shaped band 3 which is provided with helical grooves 2 and is made of a wear-resistant material, for example, steel, bronze, aluminum, a thermoplast, glass, or of casting, epoxide, or other suitable resins. This basket-like, preferably helically shaped band 3 is provided with anchoring means, for example, in the form of projections 4 extending substantially perpendicularly and radially inwardly from the band, for rigidly securing the latter to a supporting body 5 of a less expensive material, for example, of a suitable plastic.

The grooved band is preferably integrally connected to the upper and lower hubs 6 of traverse roll 1, for example, by producing the band 3 with the hubs 6 in one operation by a precision casting method, by pressure casting, by injection molding, or by a casting and spreading method.

While I have disclosed one embodiment of the present invention, it is to be understood that this embodiment is given by example only and not in a limiting sense, the scope of the present invention being determined by the objects and the claims.

I claim:
1. A yarn-guiding traverse roll comprising
    a first member consisting of at least one self-supporting helically wound band of rigid material disposed along the periphery of an imaginary cone to define spaces between said helically wound band,
    the latter having a helical groove open towards the outside of said imaginary cone,
    a second element consisting of a filler received in the spaces between the helical windings of said band and forming jointly with said helically wound band a solid, cone-shaped element having said helically wound band embedded at its periphery, and
    said self-supporting, helically wound band being of rigid, wear resistant material and said second element being formed of weaker material than said first member.
2. The yarn-guiding traverse roll, as set forth in claim 1, wherein
    said first member comprises a plurality of self-supporting helically wound bands wound in opposite directions.
3. The yarn-guiding traverse roll, as set forth in claim 1, which includes
    means for anchoring said first member in said second element.
4. The yarn-guiding traverse roll, as set forth in claim 3, wherein
    said anchoring means comprises projections extending substantially perpendicularly from and radially inwardly from said band.
5. The yarn-guiding cylinder, as set forth in claim 1, which includes
    a hub disposed integrally and coaxially with and at least at one end of said helically wound band.

References Cited in the file of this patent

UNITED STATES PATENTS

| | | |
|---|---|---|
| 1,749,355 | Reece | Mar. 4, 1930 |
| 1,836,105 | Bood | Dec. 15, 1931 |
| 1,918,210 | McKean | July 11, 1933 |
| 2,646,227 | Calhoun et al. | July 21, 1953 |
| 2,954,702 | Petersen | Oct. 4, 1960 |
| 2,998,203 | Pitts | Aug. 29, 1961 |
| 3,022,021 | Zollinger | Feb. 20, 1962 |

FOREIGN PATENTS

| | | |
|---|---|---|
| 531,595 | Great Britain | Jan. 7, 1941 |